(12) United States Patent
Mahato

(10) Patent No.: US 9,808,740 B2
(45) Date of Patent: *Nov. 7, 2017

(54) SYSTEMS, METHODS, AND APPARATUSES FOR PURIFYING LIQUIDS

(71) Applicant: SeaChange Technologies, LLC, Raleigh, NC (US)

(72) Inventor: Dipak Mahato, Raleigh, NC (US)

(73) Assignee: Seachange Technologies LLC, Raleigh, NC (US)

( * ) Notice: Subject to any disclaimer, the term of this patent is extended or adjusted under 35 U.S.C. 154(b) by 364 days.

This patent is subject to a terminal disclaimer.

(21) Appl. No.: 14/711,076

(22) Filed: May 13, 2015

(65) Prior Publication Data

US 2015/0336806 A1 Nov. 26, 2015

Related U.S. Application Data

(60) Provisional application No. 62/001,287, filed on May 21, 2014.

(51) Int. Cl.

| | |
|---|---|
| *B01D 1/16* | (2006.01) |
| *B01D 1/18* | (2006.01) |
| *B01D 1/20* | (2006.01) |
| *C02F 1/10* | (2006.01) |
| *C02F 1/12* | (2006.01) |
| *B01D 3/10* | (2006.01) |
| *B01F 3/04* | (2006.01) |
| *C02F 1/04* | (2006.01) |
| *C02F 1/06* | (2006.01) |
| *B01D 3/08* | (2006.01) |

(Continued)

(52) U.S. Cl.
CPC ............... *B01D 3/106* (2013.01); *B01D 1/16* (2013.01); *B01D 3/085* (2013.01); *B01D 3/10* (2013.01); *B01D 3/34* (2013.01); *B01F 3/04028* (2013.01); *B01F 3/04241* (2013.01); *C02F 1/048* (2013.01); *C02F 1/06* (2013.01); *B01D 1/18* (2013.01); *B01D 1/20* (2013.01); *C02F 1/10* (2013.01); *C02F 1/12* (2013.01); *C02F 2101/10* (2013.01); *C02F 2103/08* (2013.01)

(58) Field of Classification Search
CPC . B01D 3/006; B01D 1/16; B01D 1/18; B01D 1/20; C02F 1/04; C02F 1/043; C02F 1/046; C02F 1/048; C02F 1/06; C02F 1/12; C02F 1/14; C02F 1/16; C02F 1/18
USPC .................................................. 159/4.2, 4.4
See application file for complete search history.

(56) References Cited

U.S. PATENT DOCUMENTS

| | | |
|---|---|---|
| 3,137,550 A | 6/1964 | Fruth |
| 4,059,419 A | 11/1977 | Ross |

(Continued)

OTHER PUBLICATIONS

Patent Cooperation Treaty, Notification of International Search Report and Written Opinion, Application No. PCT/US15/30526, dated Aug. 13, 2015.

*Primary Examiner* — In Suk Bullock
*Assistant Examiner* — Jonathan Pilcher
(74) *Attorney, Agent, or Firm* — Kilpatrick Townsend & Stockton LLP

(57) ABSTRACT

Disclosed are methods, systems, and apparatuses for purifying liquids. One illustrative method includes generating an aerosol from a contaminated liquid. The illustrative method also includes generating a vapor from the aerosol by applying a negative pressure to the aerosol. The illustrative method further includes separating at least one type of contaminant particle from the vapor and converting the vapor into a liquid.

28 Claims, 4 Drawing Sheets

Figure 2:
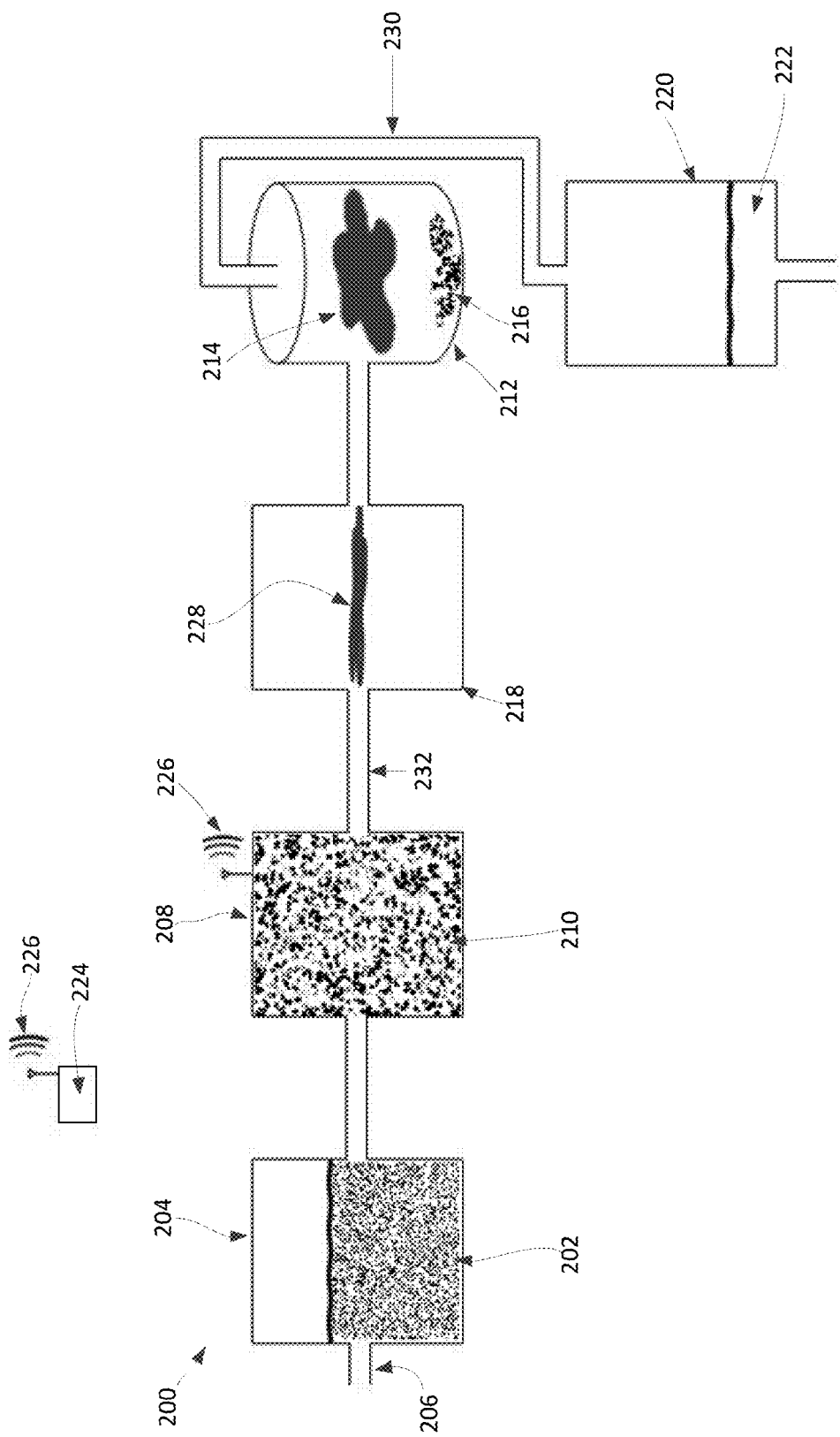

(51) Int. Cl.
*B01D 3/34* (2006.01)
*C02F 101/10* (2006.01)
*C02F 103/08* (2006.01)

(56) References Cited

U.S. PATENT DOCUMENTS

| | | |
|---|---|---|
| 4,762,646 A | 8/1988 | Fougeron et al. |
| 4,849,184 A | 7/1989 | Fougeron et al. |
| 4,938,868 A | 7/1990 | Nelson |
| 5,173,274 A | 12/1992 | Owen |
| 5,688,377 A | 11/1997 | McCutchen |
| 5,853,549 A | 12/1998 | Sephton |
| 6,047,644 A | 4/2000 | Malecki et al. |
| 2006/0032935 A1 | 2/2006 | Matsuura |
| 2009/0026399 A1 | 1/2009 | Ishibashi |
| 2012/0085635 A1 | 4/2012 | Haynes |
| 2012/0160660 A1 | 6/2012 | Karlstrom et al. |
| 2013/0126102 A1 | 5/2013 | Kitamura et al. |
| 2013/0153157 A1 | 6/2013 | Dobry et al. |

100

102
Collect a contaminated liquid

104
Convert the contaminated liquid into an aerosol

106
Vaporize the aerosol to generate a contaminated vapor mix

108
Generate a bifurcated vapor mix from the contaminated vapor mix

110
Remove contaminant particles from the bifurcated vapor mix to generate a purified vapor

112
Convert the purified vapor into a liquid state

FIG. 1

SYSTEMS, METHODS, AND APPARATUSES FOR PURIFYING LIQUIDS

REFERENCE TO RELATED APPLICATION

This application claims priority to U.S. Provisional Patent Application No. 62/001,287, entitled "Liquid Purifier," filed May 21, 2014, the entirety of which is hereby incorporated by reference herein.

FIELD OF THE INVENTION

The present invention relates to treatment of liquids. More specifically, but not by way of limitation, the present invention relates to purification of liquids.

BACKGROUND

Liquid purification is the process of removing undesirable contaminants (e.g., salt; dirt; biological materials such as protozoans, bacteria, spores, or viruses; or other particulates) from a liquid. Liquid purification has become increasingly important in a variety of contexts. For example, water may be accessible but unfit for human consumption due to environmental pollution or naturally occurring phenomena (e.g., as with ocean water). Purification of the water may sanitize the water for human use or consumption. As another example, water used for an industrial application (e.g., for hydraulic fracturing) may become contaminated as a result of the industrial application. Purification of the water may allow it to be reused in other industries or for other applications, saving resources and reducing costs. However, it can be challenging to sufficiently purify liquids of contaminants.

At present, there are two primary methods for purifying liquids: thermal-based methods and membrane-based methods. Thermal-based methods typically involve heating a contaminated liquid until it vaporizes, leaving behind contaminants. The vapor is then cooled, returning the vapor to its liquid state. Membrane-based methods typically involve using high pressure to force contaminated liquids through a membrane (e.g., a filter). Contaminants are separated from the liquid via the membrane. However, both of these methods have significant disadvantages. For example, both methods are expensive. Thermal-based methods may require significant amounts of energy to vaporize the liquid during purification, and membrane-based methods may require significant amounts of energy and expensive membranes for purification. Further, both methods are inefficient and may damage the environment. Due to the practical limitations of thermal-based and membrane-based purification systems, 50% or less of the contaminated liquid input into these purification systems may be converted into pure liquid. The remaining contaminated liquid may contain its original contaminants plus the contaminants left behind from the purified liquid. The result is a highly-concentrated contaminated liquid by-product called "brine waste." Often, brine waste may be discarded into streams or oceans, or otherwise disposed of in ways that can cause environmental problems. Further, properly disposing of brine waste may require navigating complex regulatory rules, and often requires expensive equipment (e.g., pumps, pipelines, and other facilities) for discharging the waste.

What is needed are environmentally-friendly, efficient, and cost-effective methods, systems, and apparatuses for purifying liquids.

SUMMARY

Some embodiments of the present disclosure may include a method for purifying liquids, comprising: generating an aerosol from a contaminated liquid; generating a vapor from the aerosol by applying a negative pressure to the aerosol; separating at least one type of contaminant particle from the vapor; and converting the vapor into a liquid.

In other embodiments, a system of the present disclosure may comprise: an aerosolization component; a negative pressure source; a separation component; and a condenser.

In still other embodiments, an apparatus of the present disclosure may comprise: an aerosolization component; and a negative pressure source.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE FIGURES

A full and enabling disclosure is set forth more particularly in the remainder of the specification. The specification makes reference to the following appended figures.

FIG. 1 is an example of a flow chart of steps for performing a method for purifying liquids according to one embodiment of the invention.

FIG. 2 shows an embodiment of a system of the invention for purifying liquids.

FIG. 3 shows another embodiment of a system of the invention for purifying liquids.

FIG. 4 shows an embodiment of an apparatus of the invention for purifying liquids.

DETAILED DESCRIPTION

The following description recites various aspects and embodiments of the present invention. No particular embodiment is intended to define the scope of the invention. Rather, the embodiments merely provide non-limiting examples of various methods, systems, and apparatuses that are at least included within the scope of the invention. The description is to be read from the perspective of one of ordinary skill in the art; therefore, information well-known to the skilled artisan may not necessarily be included.

DEFINITIONS AND ABBREVIATIONS

The following terms, unless otherwise indicated, shall be understood to have the following meanings.

As used herein, the terms "a," "an," and "the" can refer to one or more unless specifically noted otherwise.

The term "or" is not to be construed as identifying mutually exclusive options. For example, the phrase "X contains A or B" can mean that X contains A and not B, X contains B and not A, or X contains both A and B. That is, the term "or" is used to mean "and/or" unless explicitly indicated to refer to alternatives only or the alternatives are mutually exclusive, although the disclosure may support a definition that refers to only alternatives and "and/or." As used herein "another" can mean at least a second or more.

"Aerosol" as used herein refers to a colloid of fine liquid droplets in a gas (e.g., air).

"Aerosolization" as used herein refers to the process of converting a liquid into an aerosol.

"Aerosolization component" as used herein refers to a component operable to generate an aerosol from a liquid.

"Bifurcated vapor mix" as used herein refers to a vapor mix comprising vapor particles (generated from a vaporized liquid) and contaminant particles, in which the vapor particles are substantially separated from the contaminant particles. For example, rather than the contaminant particles being dissolved or suspended in the vapor particles, the contaminant particles are physically separate from the vapor particles.

"Binding substance" as used herein refers to a substance configured to adhere to or absorb contaminant particles for removing the contaminant particles from a vapor.

"Cavitation" as used herein refers to applying forces (e.g., changes in pressure or low-frequency ultrasound) to a liquid, causing voids or bubbles to form in the liquid. "Condenser" as used herein refers to a device configured to convert a vapor into a liquid.

"Contaminant particles" as used herein refers to any substance or particles that are undesirable for a particular application. For example, contaminant particles may render a substance or liquid in which the contaminant particles are dissolved, suspended, or otherwise intermixed unsuitable for a particular place or purpose.

"Contaminated liquid" as used herein refers to a liquid comprising at least one type of contaminant particle in an amount above a particular threshold. For example, a contaminated liquid may comprise water in which one or more types of pollutants are dissolved, suspended, or otherwise intermixed in an amount above a threshold suitable for human consumption.

"Contaminated vapor mix" as used herein refers to a vapor that contains an amount of contaminant particles above a particular threshold. For example, the contaminated vapor mix can be generated by vaporizing one or more contaminated liquids or aerosols produced from one or more contaminated liquids.

"Cyclonic separation" as used herein refers to exposing a mixture of gas and particulates to a high-speed rotating airflow (e.g., a cyclone) to separate the gas from the particulates.

"Filter" as used herein refers to a device configured to extract one substance from another substance. In some embodiments, the filter may physically block contaminant particles from passing through the filter, while allowing another substance (e.g., a vapor) to pass through the filter. In this manner, the contaminant particles can be extracted from the vapor.

"Humidifier" as used herein refers to a device configured to generate an aerosol (e.g., water vapor) from a liquid.

"Modular" as used herein refers to a design approach that subdivides a system into smaller parts (modules) that can be independently created and then used in different systems or combinations to drive multiple functionalities.

"Piezoelectric transducer" as used herein refers to a piezoelectric material configured to convert electrical signals into mechanical vibrations and/or convert mechanical vibrations into electrical signals.

"Propellant" as used herein refers to a gaseous substance kept under pressure and used to create movement of a fluid (e.g., a liquid or gas).

"Separation component" as used herein refers to a device configured to separate at least one type of contaminant particle from a vapor.

"Spinning diffuser" as used herein refers to a device configured to disperse liquid into fine droplets. In some embodiments, the spinning diffuser may comprise an impeller.

"Vapor" as used herein refers to a substance that is in a gaseous state.

"Vapor mix" as used herein refers to a vapor that contains an amount of contaminant particles above a particular threshold. The vapor mix can be generated by vaporizing one or more contaminated liquids or aerosols produced from the one or more contaminated liquids.

"Vaporization" as used herein refers to the process of generating a vapor from a liquid or aerosol.

EXAMPLE EMBODIMENTS

In some embodiments, a method of the present disclosure comprises generating an aerosol from a contaminated liquid; generating a vapor from the aerosol by applying a negative pressure to the aerosol; separating at least one type of contaminant particle from the vapor; and converting the vapor into a liquid. In some embodiments, the aerosol is generated by cavitation. In some embodiments, the aerosol is generated via treatment of the contaminated liquid with a propellant. In some embodiments, the aerosol is generated by applying the contaminated liquid to a spinning diffuser. In some embodiments, the negative pressure is generated by applying a pressure differential between at least two system components. In some embodiments, the at least one type of contaminate particle is separated from the vapor by cyclonic separation. In some embodiments, the at least one type of contaminate particle is separated from the vapor by filtration. In some embodiments, the at least one type of contaminate particle is separated from the vapor via an electrically-charged surface. In some embodiments, the at least one type of contaminate particle is separated from the vapor by binding to an adhesive substance. In some embodiments, the contaminated liquid comprises water, alcohol, oil, or any combination of these. In some embodiments, the negative pressure is generated by an air pump.

In other embodiments, a system of the present disclosure comprises an aerosolization component; a negative pressure source; a separation component; and a condenser. In some embodiments, the aerosolization component is configured to convert a contaminated liquid into an aerosol. In some embodiments, the aerosolization component may comprise a cavitation component. In some embodiments, the aerosolization component may comprise a propellant. In some embodiments, the aerosolization component may comprise a spinning diffuser. In some embodiments, the negative pressure source is configured to vaporize the aerosol to generate a vapor. In some embodiments, the negative pressure source comprises an air pump. In some embodiments, the separation component is configured to separate at least one type of contaminant particle from the vapor for generating a purified vapor. In some embodiments, the separation component may comprise a cyclonic separator. In some embodiments, the separation component may comprise a filter. In some embodiments, the separation component may comprise an adhesive and/or an absorbent substance. In some embodiments, the separation component may comprise an electrically-charged surface. In some embodiments, the condenser is configured to convert the purified vapor into a liquid. In some embodiments, the contaminated liquid comprises water, alcohol, oil, or any combination of these. In some embodiments, the aerosolization component comprises the negative pressure source.

In other embodiments, an apparatus of the present disclosure comprises an aerosolization component and a negative pressure source. In some embodiments, the apparatus is modular. In some embodiments, the aerosolization component is configured to convert a contaminated liquid into an aerosol. In some embodiments, the aerosolization component may comprise a cavitation component. In some embodiments, the aerosolization component may comprise a propellant. In some embodiments, the aerosolization component may comprise a spinning diffuser. In some embodiments, the negative pressure source is configured to vaporize the aerosol to generate a vapor. In some embodiments, the apparatus further comprises a separation component configured to separate at least one type of contaminant particle from the vapor. In some embodiments, the apparatus also comprises a condenser configured to convert the vapor into a liquid. In some embodiments, the separation component may comprise a cyclonic separator. In some embodiments, the separation component may comprise a filter. In some embodiments, the separation component may comprise an adhesive and/or an absorbent substance. In some embodiments, the separation component may comprise an electrically-charged surface. In some embodiments, the aerosolization component comprises the negative pressure source. In some embodiments, the negative pressure source comprises an air pump.

Methods for Purifying Liquids

FIG. 1 is an example of a flow chart of steps for performing a method for purifying liquids according to one embodiment of the invention. In some embodiments, the method 100 may be performed on a batch of liquid (e.g., the method 100 may be applied to one liquid sample at a time), while in other embodiments, the method 100 may be performed using a continuous flow of liquid.

As illustrated in FIG. 1, in some embodiments, the method 100 may comprise the step of collecting a contaminated liquid in a container (block 102). In some embodiments, the contaminated liquid may comprise, for example, sea water; brackish ground water; recycled municipal water; runoff water; water used in industrial applications (e.g., hydraulic fracturing); water from streams, lakes, or rivers; alcohol; or gasoline. In some embodiments, the liquid may be pumped into the container (e.g., at a controlled rate).

In some embodiments, the level of contaminated liquid in the container may be maintained at a substantially continuous level. For example, the container may comprise one or more sensors configured to detect an amount of contaminated liquid present in the container and transmit an associated sensor signal to a computing component (e.g., computing component 224 of FIG. 2). In some embodiments, the sensor may comprise a fluid level sensor, a fluid detection sensor, or any other suitable sensor. The computing component may be configured to receive the sensor signal and responsively operate a pump, valve, or other component to increase or decrease the amount of contaminated liquid present in the container.

In some embodiments, the method 100 may comprise the step of converting the contaminated liquid into an aerosol (i.e., a contaminated aerosol) (block 104). Converting a liquid into an aerosol may be referred to herein as "aerosolizing" the liquid. An aerosol comprises a colloid of fine liquid droplets in a gas (e.g., air). Thus, the aerosol resulting from the contaminated liquid may comprise a colloid of fine droplets of the contaminated liquid in a gas.

In some embodiments, the contaminated liquid is converted into the aerosol by cavitation. Cavitation may comprise applying forces (e.g., changes in pressure or low-frequency ultrasound) to a liquid, causing voids or bubbles to form in the liquid. The voids or bubbles may rapidly collapse, generating a shock wave that may release energy in the form of heat, sound, or light. This release of energy may convert the liquid into an aerosol. In some embodiments, cavitation may comprise ultrasonic cavitation, mechanical cavitation, inertial cavitation, or non-inertial cavitation.

In other embodiments, the contaminated liquid is converted to the aerosol via a humidifier. The humidifier may comprise, for example, a piezoelectric transducer. The piezoelectric transducer may vibrate the contaminated liquid at an ultrasonic frequency, generating a fine mist of droplets (e.g., aerosolizing the contaminated liquid).

In still other embodiments, the contaminated liquid is converted to the aerosol via other methods. For example, the contaminated liquid may be converted into the aerosol using propellants and/or high pressure (e.g., as with an aerosol can and/or high-pressure spraying device, respectively), or spinning diffusers (e.g., an impeller-driven device to disperse liquid into fine droplets). In one such embodiment, the contaminated liquid is applied to a spinning diffuser. Upon the contaminated liquid interacting with a spinning diffuser, the contaminated liquid may be dispersed into droplets, forming the aerosol.

In some embodiments, the method 100 may comprise the step of vaporizing (e.g., converting into a vapor) the aerosol to generate a contaminated vapor mix (block 106). In some embodiments, the aerosol generated from the contaminated liquid is vaporized by applying a low pressure to the aerosol. Such a method of vaporization may be possible because the evaporation rate of a liquid may be influenced by the ratio of the surface area of the liquid to the volume of the liquid. Further, the evaporation rate of a liquid may also be influenced by the ratio of the vapor pressure to the surrounding air pressure. Thus, by applying a low pressure (e.g., a negative pressure) to the aerosol generated from the contaminated liquid, due to the high surface area and low volume of the fine liquid droplets in the aerosol, and the relative vapor and air pressures, the aerosol may rapidly vaporize. In some embodiments, aerosolization of the contaminated liquid (e.g., as described in block 104) and vaporization of the aerosol (e.g., as described in block 106) may occur substantially simultaneously.

In other embodiments, the aerosol generated from the contaminated liquid is vaporized using other methods. For example, the aerosol may be vaporized by heating (e.g., via solar energy) the aerosol; applying radiation (e.g., ultraviolet, infrared, visible light, microwave, radio, x-ray, or gamma ray radiation) to the aerosol; applying electricity to the aerosol; and/or applying a cyclonic flow to the aerosol. In some embodiments, any remaining aerosol that has not been sufficiently vaporized may be removed from the system, for example, by a demister.

In some embodiments, the method 100 may comprise the step of generating a bifurcated vapor mix from the contaminated vapor mix (block 108). In some embodiments, generating the bifurcated vapor mix may occur substantially simultaneously with vaporizing the aerosol produced from the contaminated liquid (e.g., as described in block 106). For example, during vaporization of the aerosol, the liquid making up the aerosol droplets (hereinafter the "target liquid") may separate from the contaminant particles formerly dissolved (or suspended) in the liquid. The result can be the bifurcated vapor mix. The bifurcated vapor mix may comprise the vaporized target liquid substantially separated from the contaminant particles.

In some embodiments, the method 100 may comprise the step of removing the contaminant particles from the bifurcated vapor mix to generate a purified vapor (block 110). The purified vapor may substantially comprise only the vaporized target liquid.

In some embodiments, the contaminant particles are removed from the vaporized target liquid via cyclonic separation. Cyclonic separation may comprise exposing a mixture of gas and particulates to a high-speed rotating airflow (e.g., a cyclone). Because the particulates may be too dense to follow the path of the rotating airflow, they may fall to the bottom of the cyclonic separator. Conversely, the gas may have a low enough density to follow the path of the rotating airflow. Thus, the particulates may separate and be removed from the gas. In some embodiments, these principles may be applied to the bifurcated vapor mix (e.g., via a cyclonic separator), which may result in the contaminant particles being separated and removed from the vaporized target liquid to generate the purified vapor.

In other embodiments, the contaminant particles are removed from the vaporized target liquid by a filter to generate the purified vapor. The filter may physically block the contaminant particles from passing through the filter, while the filter may allow the vaporized target liquid to pass through the filter. In some embodiments, the filter comprises a surface filter or a depth filter. For example, the filter may comprise a High Efficiency Particulate Arrestance (HEPA) filter and/or similar material that can remove particulate debris from air.

In still other embodiments, the contaminant particles are removed from the vaporized target liquid by gravity to generate the purified vapor. For example, in one such embodiment, the bifurcated vapor mix may be housed in a container. Gravitational forces may act on the contaminant particles more strongly than the vaporized target liquid, causing the contaminant particles to separate from the vaporized target liquid and settle at the bottom of the container.

In some embodiments, the contaminant particles are removed from the vaporized target liquid by other methods to generate the purified vapor. For example, the bifurcated vapor mix may be housed in a container comprising a binding substance (e.g., an absorbent or adhesive substance) that interacts with and/or can bind to the contaminant particles. Examples of the substance may comprise activated carbon, an electrostatic material, and/or other material which may preferentially interact with contaminant particles As the contaminant particles interact with the substance, they may adhere to the substance and separate from the vaporized target liquid. As another example, the bifurcated vapor mix may be housed in a container comprising an electromagnetically-charged surface. The electromagnetically-charged surface may electrically attract the contaminant particles. As the contaminant particles interact with the surface, they may adhere to the surface and separate from the vaporized target liquid to generate the purified vapor.

In some embodiments, the method 100 may comprise the step of converting the purified vapor back into a liquid state (block 112). For example, in such an embodiment, the purified vapor (e.g., comprising substantially only the vaporized target liquid) may be condensed into liquid state. The purified vapor may be condensed via a condenser or heat exchanger.

In some embodiments, the resulting liquid may be sufficiently purified. The resulting liquid can be sufficiently purified if it is has a number of contaminant particles below a threshold. The threshold may depend on the particular use for the resulting liquid. In some embodiments, the resulting liquid is sufficiently purified if the resulting liquid has less than 200 milligrams/liter (mg/L) of salt, less than 0.01 mg/L of arsenic, less than 2.0 mg/L of copper, less than 0.07 mg/L of nickel, and/or less than 0.01 mg/L of benzene. In some embodiments in which the liquid is purified in batches, if the resulting liquid has not been sufficiently purified, the method 100 may return to block 102 or 104. For example, the method 100 may be repeated using the resulting liquid as the input contaminated liquid. The method 100 may be repeated any number of times, for example, until the resulting liquid reaches a sufficient purification level.

Systems for Purifying Liquids

FIG. 2 shows an embodiment of a system 200 of the invention for purifying liquids. In this embodiment, contaminated liquid 202 enters the system 200 via a conduit 206 (e.g., a pipe, tube, or valve). The contaminated liquid 202 may be collected or stored in a container 204. In some embodiments, the contaminated liquid 202 may be stored in a plurality of containers.

In some embodiments, the container 204 (and/or the aerosolization component 208) comprises one or more sensors for determining a characteristic of the contaminated liquid 202. For example, the container 204 may comprise a density, temperature, pH, or other sensor. The sensor may be configured to transmit a sensor signal associated with the characteristic to a computing component 224.

In some embodiments, the system 200 (e.g., computing component 224) determines, based on data from the sensor, if the level of contamination of the contaminated liquid 202 exceeds a threshold. If the level of contamination of the contaminated liquid 202 exceeds the threshold, the system 200 may output a notification or alert (e.g., via a mechanical, chemical, or electronic component) to a user. For example, upon the level of contamination of the contaminated liquid 202 exceeding a threshold, the computing component 224 (described in further detail below) may output a notification, or chemical component (not shown) may change color. The notification or color change may indicate that the contaminated liquid 202 may be too contaminated for use with the system 200. Additionally or alternatively, if the level of contamination of the contaminated liquid 202 exceeds the threshold, the system 200 may prevent the contaminated liquid 202 from continuing through the system 200 (e.g., by closing a valve). In some embodiments, other aspects of the system 200 (e.g., temperature, pressure, fluid level, and/or fluid flow) may be monitored using one or more sensors.

In some embodiments, the contaminated liquid 202 is transmitted to an aerosolization component 208. The aerosolization component 208 may be configured to convert a liquid into an aerosol 210. In some embodiments, a negative pressure source 218 (e.g., an air pump or vacuum) induces a suction, pulling the contaminated liquid 202 into the aerosolization component 208. In other embodiments, the container 204 comprises the aerosolization component 208. For example, the contaminated liquid 202 may be collected and/or stored in the aerosolization component 208. In another embodiment, gravity causes the contaminated liquid 202 to flow into the aerosolization component 208, for example, if the container 204 is at a higher elevation than the aerosolization component 208.

In some embodiments, the aerosolization component 208 may comprise, for example, a cavitation component. In some embodiments, the cavitation component may comprise one or more ultrasonic transducers configured to generate ultrasonic pressure waves for inducing cavitation in the contaminated liquid 202. Such cavitation may transform the contaminated liquid 202 into an aerosol 210.

In some embodiments, the aerosolization component 208 may comprise one or more sensors (e.g., density, pH, or temperature sensors) configured to determine a characteristic of the contaminated liquid 202 and transmit an associated sensor signal (e.g., to computing component 224). The system 200 (e.g., the computing component 224) may determine one or more characteristics (e.g., the frequency, magnitude, waveform, or duration) of an ultrasonic pressure wave to generate for inducing cavitation based on the characteristic of the contaminated liquid 202. For example, the system 200 may determine a magnitude of an ultrasonic pressure wave to generate for inducing cavitation based on the density of the contaminated liquid 202 and/or the size of the contaminant particles therein. In some embodiments, the system 200 may change the position of the ultrasonic transducers with respect to the contaminated liquid 202 based on the characteristic of the contaminated liquid 202, for example, to more optimally induce cavitation in the contaminated liquid 202.

In other embodiments, the aerosolization component 208 may comprise a humidifier, piezoelectric transducer, a propellant, and/or a spinning diffuser. In one such embodiment, the aerosolization component 208 comprises a spinning diffuser. Upon the contaminated liquid 202 interacting with a spinning diffuser, the contaminated liquid 202 may be dispersed into droplets, forming the aerosol 210. The contaminated liquid 202 may be converted to an aerosol 210 using any number or combination of aerosolization techniques.

In some embodiments, the aerosol 210 may be vaporized, generating a vapor mix 228 comprising the vaporized target liquid 214 and the contaminant particles 216 formerly dissolved in the liquid. In some embodiments, vaporization occurs in the aerosolization component 208. In other embodiments, vaporization occurs in a conduit 232 positioned between the aerosolization component 208 and the negative pressure source 218. In still other embodiments, vaporization occurs in other components of the system 200, for example, in the negative pressure source 218.

In some embodiments, applying a pressure (e.g., negative pressure) to the aerosol 210 causes the aerosol 210 to vaporize. The pressure may be applied to the aerosol 210 by a negative pressure source 218. In some embodiments, the negative pressure source 218 comprises a vacuum or air pump. In other embodiments, the negative pressure source 218 comprises a pressure differential between components in the system 200. The pressure differential may generate a negative pressure sufficient to vaporize the aerosol 210. For example, in one embodiment, some components of the system 200 may be at a first pressure level. Other components of the system 200 may be at a second pressure level different from the first pressure level. In some embodiments, such a pressure differential may be generated by positioning components of the system 200 at different altitudes. The pressure differential between the first pressure level and the second pressure level may generate a negative pressure across the system 200 sufficient to vaporize the aerosol 210.

As another example, in some embodiments, some components of the system 200 may be at a first pressure level, for example, if immersed in a medium (e.g., a liquid). Other components of the system 200 may be at a second pressure level, for example, if positioned within a different medium (e.g., air or another liquid), or at a different depth within the medium. In some embodiments, the first pressure level may be higher than the second pressure level. The pressure differential between the various components of the system 200 may generate a negative pressure sufficient to vaporize the aerosol 210.

In some embodiments, thermal energy (e.g., solar energy or heat) is applied to the aerosol 210, causing the aerosol 210 to vaporize. In other embodiments, radiation (e.g., ultraviolet, infrared, visible light, microwave, radio, x-ray, or gamma ray radiation) is applied to the aerosol 210, causing the aerosol 210 to vaporize. For example, a component of the system 200 (e.g., the aerosolization component 208, conduit 232, or a separation component 212) may comprise an ultraviolet gas laser, a laser diode, or a lamp. The ultraviolet gas laser, laser diode, or lamp may apply radiation to the aerosol 210, causing the aerosol 210 to vaporize. The aerosol 210 may be vaporized using any number or combination of vaporization techniques or components.

In some embodiments, the aerosol 210 is transmitted (e.g., via conduit 232) to the negative pressure source 218. For example, the negative pressure source 218 may generate a suction, which may pull the aerosol 210 into the negative pressure source 218. Although the negative pressure source 218 is depicted in the embodiment shown in FIG. 2 as being positioned before the separation component 212, in other embodiments, the negative pressure source 218 may be positioned in a different configuration. For example, the negative pressure source 218 may be positioned between the separation component 212 and a condenser 220. As another example, the aerosolization component 208 may comprise the negative pressure source 218. As still another example, the entire system 200 may be under negative pressure. Further, in some embodiments, the negative pressure source 218 may not comprise a physical component, but may rather comprise a sufficient pressure differential across the system 200 components for vaporization (e.g., if the system 200 components are positioned at different altitudes or in different mediums). Alternatively, in some embodiments, the negative pressure source 218 may comprise one or more physical components and one or more pressure differentials across components of the system 200.

In some embodiments, the vapor mix 228 is transmitted to a separation component 212. For example, application of the negative pressure source 218 may result in the transfer of the vapor mix 228 into the separation component 212. In other embodiments, the negative pressure source 218 comprises the separation component 212. That is, the separation component 212 may be housed within or be a part of the negative pressure source 218.

In some embodiments, the separation component 212 is configured to separate the vaporized target liquid 214 from the contaminant particles 216. In some embodiments, the separation component 212 comprises a cyclonic separator. The cyclonic separator may expose the vapor mix 228 to a high-speed rotating airflow, which may cause the denser and/or heavier contaminant particles 216 to separate from the vaporized target liquid 214. In other embodiments, the separation component 212 comprises a filter. The filter may physically block the contaminant particles 216 from passing through the filter, while allowing the vaporized target liquid 214 to pass through the filter. In some embodiments, the separation component 212 comprises a container or a pipe. The container or pipe may be configured to allow the vaporized target liquid 214 and the contaminant particles 216 to naturally separate, for example, as a result of gravity. Because the vaporized target liquid 214 may be less dense and/or lighter than the contaminant particles 216, gravity may cause the contaminant particles 216 to settle at the bottom of the container or pipe, separating the contaminant particles 216 from the vaporized target liquid 214. In other embodiments, the separation component 212 comprises a substance that interacts with and/or can bind to the contaminant particles 216 (e.g., an absorbent or adhesive substance) or an electrically-charged surface. As contaminant particles 216 in the vapor mix 228 interact with the substance or the electrically-charged surface, the contaminant particles 216 may adhere to the substance or surface, respectively, thus separating from the vaporized target liquid 214.

In some embodiments, the contaminant particles 216 are removed from the separation component 212 and/or the system 200. For example, the separation component 212 may comprise a conduit (e.g., pipe), removable cap or cover, hole, door, or other means for providing access to the separation component 212, through which contaminant particles 216 can be removed from the separation component 212 (e.g., by a user). As another example, the separation component 212 may comprise one or more jets configured to emit one or more gasses (e.g., air) or liquids (e.g., water). The gases or liquids may push the contaminant particles 216 through a tube (not shown) coupled to the separation component 212. This may remove the contaminant particles 216 from the separation component 212. As still another example, one or more pumps (e.g., an air pump) may be coupled to the separation component 212. The pumps may generate a suction configured to pull the contaminant particles 216 out of the separation component 212.

In some embodiments, the separation component 212 transmits the vaporized target liquid 214 into a condenser 220 (e.g., via a conduit 230). The condenser 220 may comprise, for example, a heat exchanger. The condenser 220 may convert the vaporized target liquid 214 back into a liquid state. In some embodiments, the resulting liquid 222 is sufficiently purified. In other embodiments, the resulting liquid 222 is returned to the container 204 or the aerosolization component 208, for example, to undergo further purification.

In some embodiments, the condenser 220 comprises one or more sensors for determining a characteristic of the resulting liquid 222. For example, in some embodiments, the condenser 220 comprises a density, temperature, pH, or other sensor for determining if the level of contamination of the resulting liquid exceeds a threshold. In some embodiments, if the level of contamination of the resulting liquid exceeding a threshold, the system 200 may output a notification or alert to a user. The notification or alert may indicate that the resulting liquid may be too contaminated for a desired application (e.g., human consumption). In other embodiments, if the level of contamination of the resulting liquid exceeding a threshold, the system 200 may automatically return the resulting liquid to the container 204 or the aerosolization component 208 for continued purification.

In some embodiments, the condenser 220 generates excess thermal energy (e.g., heat) upon condensing the vaporized target liquid 214 back into a liquid state. The excess thermal energy may be applied (e.g., via a pipe coupled between the condenser 220 and the aerosolization component 208) to the aerosol 210, for example, to vaporize or expedite the vaporization of the aerosol 210.

In some embodiments, the computing component 224 operates and/or is in communication with one or more system 200 components. The computing component 224 may comprise a processor interfaced with other hardware via a bus. A memory, which may comprise any suitable tangible (and non-transitory) computer-readable medium such as RAM, ROM, EEPROM, or the like, can comprise program components that configure operation of the computing component 224. The computing component 224 may further include input/output interface components and additional storage.

The computing component 224 may operate the one or more system 200 components via a communication component 226. The communication component 226 may be coupled to the computing component 224 and/or one or more system 200 components. The communication component 226 may represent one or more of any components that facilitate a network connection. In the embodiment shown in FIG. 2, the communication component 226 is wireless and may include wireless interfaces such as IEEE 802.11, Bluetooth, or radio interfaces for accessing cellular telephone networks (e.g., transceiver/antenna for accessing a CDMA, GSM, UMTS, or other mobile communications network). In other embodiments, the communication component 226 may include a wired interface, such as Ethernet, USB, or IEEE 1394.

Although each of the components in the system 200 are depicted in FIG. 2 as singular components, the system 200 may comprise any number of such components (e.g., a plurality of containers 204, aerosolization components 208, separation components 212, negative pressure sources 218, and/or condensers 220) configured in series or in parallel.

In some embodiments, multiple systems 200 may be configured in series or in parallel. For example, a liquid purification system may comprise multiple systems 200 configured in parallel.

Figure 3:
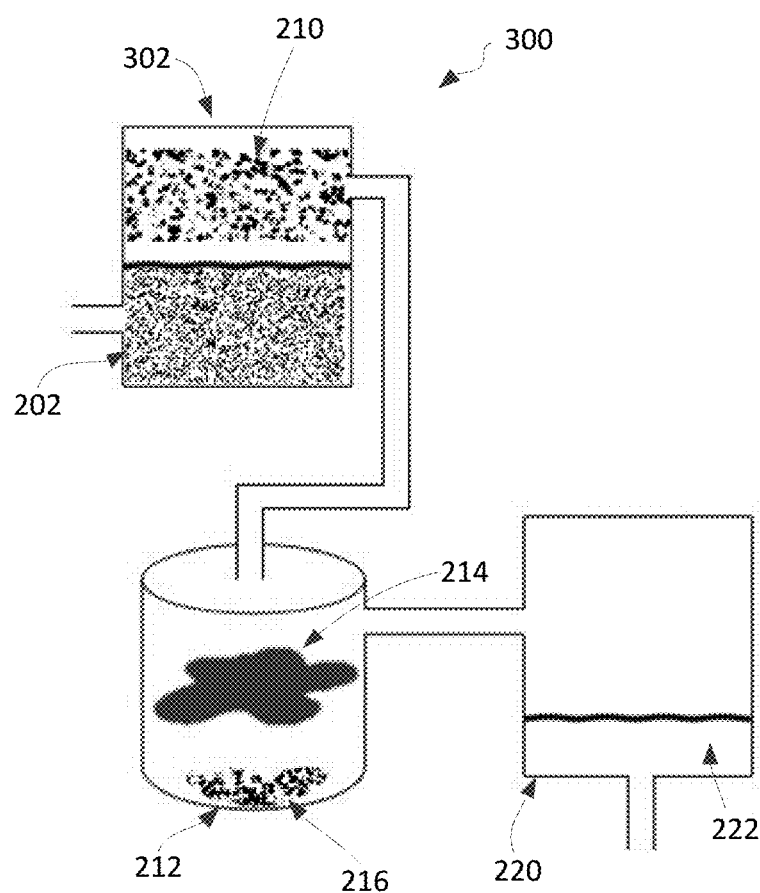

FIG. 3 shows another embodiment of a system 300 of the invention for purifying liquids. In this embodiment, the component 302 comprises the container and the aerosolization component as one unit. That is, the single component 302 may comprise the contaminated liquid 202 and a component configured to convert the contaminated liquid 202 into an aerosol 210. For example, the component 302 may comprise a cavitation component, a spinning diffuser, or any other number or configuration of aerosolization components. The component 302 may convert the contaminated liquid 202 into an aerosol 210.

In some embodiments, upon converting the contaminated liquid into an aerosol 210, the system 300 may vaporize the aerosol 210, generating a vapor mix. For example, in some embodiments, the component 302 may be at a first pressure. The separation component 212 and the condenser 220 may be at a second pressure. The first pressure may be higher than the second pressure. The difference in pressure between the first pressure and the second pressure may generate a negative pressure (e.g., a vacuum) in the system 300, which may create a suction from the component 302 into the separation component 212. In some embodiments, the component 302 may open a valve, which applies the negative pressure to the aerosol 210, causing the aerosol 210 to be transferred from the component 302 into the separation component 212. Further, this negative pressure may substantially simultaneously vaporize the aerosol 210. In other embodiments, the system 300 may comprise a heating component configured to heat the aerosol 210 until it vaporizes. The component 302 may comprise any number or configuration of vaporization components.

The separation component 212 may receive the vapor mix and separate the vaporized target liquid 214 from the contaminant particles 216. For example, the separation component 212 may comprise one or more gas jets for generating a high-speed rotating flow of gasses (e.g., for cyclonic separation) or one or more filters for separating the target liquid 214 from the contaminant particles 216. The separation component 212 may comprise any number or configuration of components for separating the vaporized target liquid 214 from the contaminant particles 216.

In some embodiments, due to a pressure differential between components in the system 300, gravity, or other factors, the vaporized target liquid 214 may be transmitted to the condenser 220. The condenser 220 may condense the vaporized target liquid 214 into a liquid state. In some embodiments, the resulting liquid 222 may be substantially purified. In other embodiments, the resulting liquid 222 may be discarded or returned to the component 302 (e.g., by a pump) for continued purification.

Apparatuses for Purifying Liquids

Figure 4:
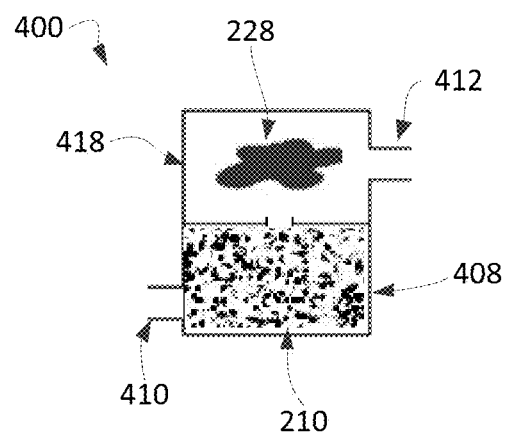

FIG. 4 shows an embodiment of an apparatus 400 of the invention for purifying liquids. In this embodiment, the apparatus 400 comprises an aerosolization component 408. The apparatus 400 may also comprise a negative pressure source 418 (e.g., a vacuum) in communication with the aerosolization component 408. In some embodiments, the apparatus 400 may further comprise a separation component (e.g., the separation component 212 of FIG. 2), a condenser (e.g., the condenser 220 of FIG. 2), and/or other liquid purification system components. In other embodiments, the apparatus may not comprise the negative pressure source 418. In one such embodiment, the apparatus may only comprise the aerosolization component 408.

In some embodiments, the apparatus 400 may comprise a modular device (e.g., the apparatus 400 may be modular), for example, configured for use with a liquid purification system. A modular device may comprise one or more components configured to be connected to or combined with other components of a system. For example, in some embodiments, the apparatus 400 may be coupled, for example by a conduit 410, to a container for collecting a contaminated liquid. The aerosolization component 408 may receive the contaminated liquid and convert the contaminated liquid to an aerosol 210. The apparatus 400 may further generate a vapor mix 228 from the aerosol 210 by applying, for example, a negative pressure to the aerosol 210. In some embodiments, the negative pressure may be applied by the negative pressure source 418. In some embodiments, the apparatus 400 may be coupled, for example by a conduit 412, to other liquid purification system components. For example, the apparatus 400 may be coupled to a separation component for separating the vaporized target liquid from the contaminant particles, and/or a condenser for transforming the vaporized target liquid back into a liquid state. The apparatus 400 may be used with any number or configuration of systems (e.g., liquid purification systems).

In some embodiments, multiple apparatuses 400 may be configured in series or in parallel. For example, a liquid purification system may comprise multiple apparatuses 400 configured in parallel.

Example System

A system was developed to demonstrate an example of a liquid purification system according to some aspects of the present disclosure. The system was assembled by first connecting the output of an ultrasonic humidifier (a Safety 1st® model IH166 humidifier) to the input of a cyclonic separator. The cyclonic separator was taken from a Dyson® model DC44 vacuum. The connection was formed using 20 feet of clear PVC pipe having a 2 inch diameter. The output of the cyclonic separator was connected to a household vacuum cleaner (a Dirt Devil® model M08230 vacuum cleaner) with a flexible 2 inch vacuum hose. The output of the household vacuum cleaner was connected to an automotive radiator (from General Motors®). The automotive radiator was modified to be cooled externally by forced air flow. The output of the automotive radiator was positioned to allow condensing water ("output water") to collect in a container.

To test the system, a contaminated liquid (synthetic sea water) was synthesized by dissolving Instant Ocean® sea salt in water according to the manufacturer's instructions (e.g., as provided on the manufacturer's website, http://www.instantocean.com). The ultrasonic humidifier's reservoir was filled with the contaminated liquid. The humidifier, vacuum, and automotive radiator were turned on and allowed to run for 6 hours, during which time output water collected in the container. The specific gravity of the output water was determined (via a hydrometer by Instant Ocean®) and compared to the specific gravity of the original contaminated liquid (e.g., the synthetic sea water). The original contaminated liquid had a specific gravity of 1.021 (which is similar to sea water), and the output water had a specific gravity of 1.000. The reduced specific gravity of the output water demonstrates that the output water had a reduced number of contaminants (e.g., salts) from the original contaminated liquid.

Advantages of Liquid Purification Embodiments

There are numerous advantages to the liquid purification systems, methods, and apparatuses disclosed herein. For example, embodiments that vaporize an aerosol via negative pressure can require less energy than for traditional liquid purification systems that rely on thermal vaporization. Additionally, negative pressure vaporization can allow embodiments to be constructed from cheaper materials than traditional liquid purification systems built for thermal vaporization. For example, such embodiments may not have to be built to withstand the high temperatures and temperature fluctuations associated with thermal vaporization.

Likewise, embodiments that separate the vaporized target liquid from contaminant particles via cyclonic separation can require less energy than for traditional filtration or reverse-osmosis liquid purification systems. Additionally, such embodiments can be constructed from cheaper materials than traditional filtration or reverse-osmosis liquid purification systems. For example, embodiments may not require expensive filters or membranes, and may not have to be built to withstand the high pressures associated with traditional filtration or reverse-osmosis techniques.

Further, some embodiments may not generate the brine waste (e.g., concentrated liquid waste) that is associated with traditional thermal-based or membrane-based purification systems. This can significantly reduce or eliminate the monetary and environmental costs associated with properly managing and disposing of brine waste. Instead, some embodiments may generate a dry waste product (e.g., pure salt from purified ocean water), which can be less expensive to manage that brine waste and/or may be a valuable product itself.

What is claimed is:
1. A method comprising:
  generating, by an aerosolization component, an aerosol from a liquid;

generating, by a negative pressure source, a vapor from the aerosol by applying a negative pressure to the aerosol, wherein the aerosol is converted into the vapor using only the negative pressure from the negative pressure source;

separating, by a separation component, a contaminant particle from the vapor to generate an at least partially decontaminated vapor; and converting, by a condenser, the least partially decontaminated vapor into liquid form.

2. The method of claim 1, wherein the aerosol is generated by at least one of cavitation, treatment of the liquid with a propellant, or applying the liquid to a spinning diffuser.

3. The method of claim 1, wherein the negative pressure is generated by applying a pressure differential between at least two system components.

4. The method of claim 1, wherein the contaminant particle is separated from the vapor by at least one of cyclonic separation, gravity, filtration, application to an electrically-charged surface, or binding to an adhesive substance.

5. The method of claim 1, wherein the liquid comprises at least one of water, alcohol, or oil.

6. The method of claim 1, wherein the negative pressure is generated by an air pump.

7. A system comprising:
an aerosolization component configured to receive a liquid and convert the liquid into an aerosol;
a negative pressure source configured to convert the aerosol into a vapor by applying a negative pressure to the aerosol, wherein the aerosol is converted into the vapor using only the negative pressure from the negative pressure source;
a separation component configured to separate a contaminant particle from the vapor to generate an at least partially decontaminated vapor; and
a condenser configured to convert the at least partially decontaminated vapor into liquid.

8. The system of claim 7, wherein the aerosolization component comprises at least one of a cavitation component, a propellant, or a spinning diffuser.

9. The system of claim 7, wherein the negative pressure source comprises an air pump.

10. The system of claim 7, wherein the separation component comprises a cyclonic separator.

11. The system of claim 7, wherein the separation component comprises a filter.

12. The system of claim 7, wherein the separation component comprises an electrically-charged surface.

13. The system of claim 7, wherein the separation component comprises an adhesive or absorbent substance.

14. The system of claim 7, wherein the system is configured to reduce an amount of contaminant particles in a contaminated liquid that comprises at least one of water, alcohol, or oil.

15. The system of claim 7, wherein the aerosolization component comprises the negative pressure source.

16. An apparatus comprising:
an aerosolization component configured to receive a liquid and convert the liquid into an aerosol; and
a negative pressure source configured to convert the aerosol into a vapor by applying a negative pressure to the aerosol, wherein the aerosol is converted into the vapor using only the negative pressure from the negative pressure source.

17. The apparatus of claim 16, wherein the apparatus is modular.

18. The apparatus of claim 16, wherein the aerosolization component comprises a cavitation component.

19. The apparatus of claim 16, wherein the aerosolization component comprises a propellant.

20. The apparatus of claim 16, wherein the aerosolization component comprises a spinning diffuser.

21. The apparatus of claim 16, further comprising a separation component configured to separate at least one type of contaminant particle from the vapor.

22. The apparatus of claim 16, further comprising a condenser configured to convert the vapor into a liquid.

23. The apparatus of claim 21, wherein the separation component comprises a cyclonic separator.

24. The apparatus of claim 21, wherein the separation component comprises a filter.

25. The apparatus of claim 21, wherein the separation component comprises an electrically-charged surface.

26. The apparatus of claim 21, wherein the separation component comprises an adhesive or absorbent substance.

27. The apparatus of claim 16, wherein the aerosolization component comprises the negative pressure source.

28. The apparatus of claim 16, wherein the negative pressure source comprises an air pump.

* * * * *